United States Patent
Dickerson et al.

(10) Patent No.: US 7,521,914 B2
(45) Date of Patent: *Apr. 21, 2009

(54) PHOTOVOLTAIC DC-TO-AC POWER CONVERTER AND CONTROL METHOD

(75) Inventors: Arthur F. Dickerson, San Luis Obispo, CA (US); Rick West, Pismo Beach, CA (US)

(73) Assignee: Xantrex Technology, Inc., Arlington, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/006,472

(22) Filed: Jan. 2, 2008

(65) Prior Publication Data

US 2008/0106921 A1    May 8, 2008

Related U.S. Application Data

(63) Continuation of application No. 11/161,639, filed on Aug. 10, 2005, now Pat. No. 7,319,313.

(51) Int. Cl.
*G05F 1/40* (2006.01)
(52) U.S. Cl. .................................. 323/288; 323/285
(58) Field of Classification Search ............... 323/225, 323/268, 282, 283, 284, 285, 351, 906
See application file for complete search history.

(56) References Cited

U.S. PATENT DOCUMENTS

| | | | |
|---|---|---|---|
| 6,271,651 B1 | 8/2001 | Stratakos et al. | |
| 6,278,245 B1 * | 8/2001 | Li et al. | 363/98 |
| 6,304,065 B1 | 10/2001 | Wittenbreder | |
| 6,850,044 B2 | 2/2005 | Hansen et al. | |
| 7,064,495 B2 * | 6/2006 | Lurkens et al. | 315/224 |
| 7,148,659 B2 * | 12/2006 | Lanni | 363/142 |
| 7,319,313 B2 * | 1/2008 | Dickerson et al. | 323/288 |

* cited by examiner

*Primary Examiner*—Jessica Han
(74) *Attorney, Agent, or Firm*—Nixon Peabody LLP (57) ABSTRACT

An apparatus and method of control for converting DC (direct current) power from a solar photovoltaic source to AC (alternating current) power. A novel DC-to-AC power converter topology and a novel control method are disclosed. This combination of topology and control are very well suited for photovoltaic microinverter applications. Also, a novel variant of this control method is illustrated with a number of known photovoltaic DC-to-AC power converter topologies. The primary function of both control methods is to seek the maximum power point (MPP) of the photovoltaic source with novel, iterative, perturb and observe control algorithms. The control portion of this invention discloses two related control methods, both an improvement over prior art by having greatly improved stability, dynamic response and accuracy.

7 Claims, 7 Drawing Sheets

Fig. 1
Prefered Control Method

Fig. 2
Prior Art Control Method

PHOTOVOLTAIC DC-TO-AC POWER CONVERTER AND CONTROL METHOD

CROSS-REFERENCE TO RELATED APPLICATIONS

This application is a continuation of U.S. patent application Ser. No. 11/161,639, filed on Aug. 10, 2005, entitled "Photovoltaic DC-to-AC Power Converter and Control Method".

FIELD OF THE INVENTION

The present invention relates to an electrical power converter used with a solar photovoltaic source to condition and couple the DC energy of the solar photovoltaic source to the AC lines of an electric utility.

BACKGROUND OF THE INVENTION

Most of today's solar photovoltaic (PV) power sources are utility connected. About 75% of these installations are residential rooftop systems with less than 2 kW capability. These systems typically comprise a number of PV modules arranged in series configuration to supply a power converter, commonly called an inverter, which changes the direct current (DC) from the modules to alternating current (AC) to match the local electrical utility supply.

There is a difficulty with small solar power systems on residential rooftops. Gables and multiple roof angles make it difficult on some houses to obtain enough area having the same exposure angle to the sun for a system of 2 kW. A similar problem arises where trees or gables shadow one portion of an array, but not another. In these cases the DC output of the series string of modules is reduced to the lowest current available from any cell in the entire string. This occurs because the PV array is a constant current source unlike the electric utility, which is a constant voltage source.

An inverter that economically links each PV module to the utility grid can solve these problems as the current limitation will then exist only on the module that is shaded, or at a less efficient angle and does not spread to other fully illuminated modules. This arrangement can increase total array output by as much as two times for some configurations. Such a combination of a single module and a microinverter is referred to as a PV AC module. The AC output of the microinverter will be a constant-current AC source that permits additional units to be added in parallel.

PV AC modules now available suffer poor reliability owing to early failure of the electrolytic capacitors that are used to store the solar cell energy before it is converted to AC. The capacitor aging is a direct consequence of the high temperature inherent in rooftop installations.

The electrolytic capacitors in the power circuit perform two functions. First, the capacitors hold the output voltage of the PV modules close to the maximum power point (MPP) output despite variations in sunlight, temperature or power line conditions and second, the capacitors store energy at the input and even out the DC voltage variations at the power-line frequency that result from changing the DC to AC. These functions place an additional stress on the capacitor causing internal heating that adds to the effects of high external temperature.

The high temperature reached by PV system inverters is a natural consequence of their outdoor mounting. This requires a rainproof enclosure that complicates the heat removal process. The coincidence of maximum power throughput and losses at exactly the time of maximum heating by the sun on both the enclosure and the ambient air exacerbates the condition.

Existing inverter topologies have made the electrolytic capacitor an integral part of the inverter circuit because of the high capacitance value required to store energy from the PV module. If high capacitance is required, the only economic choice is the electrolytic capacitor. Plastic film capacitors are recognized as superior in aging characteristics, but are much more expensive for the same capacitance. Thus, a means to avoid use of electrolytic capacitors can contribute to the reliability of PV power sources.

Figure 2:
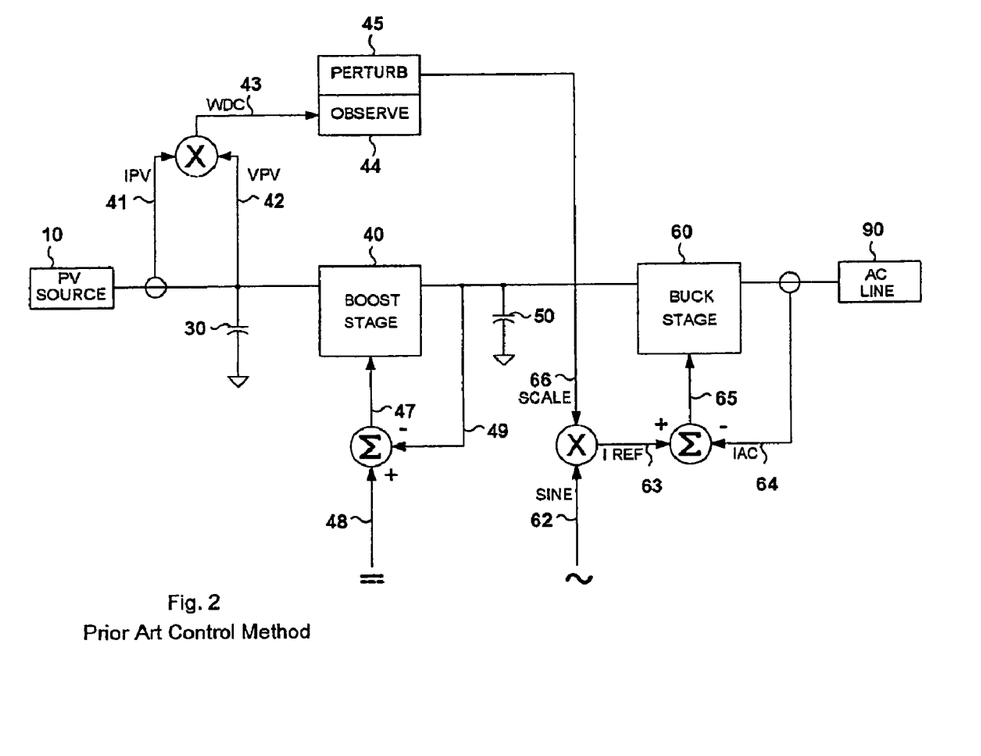
FIG. 2 shows the prior art power converter control method.

FIG. 2 illustrates the control system for a conventional photovoltaic (PV) DC-to-AC power converter. This power converter has a pulse width modulated, voltage regulating boost stage and a pulse width modulated, current regulating buck stage. Sinusoidal reference 62 follows AC line 90 voltage and frequency. AC line current reference 63 is generated by multiplying sinusoidal reference 62 by scaling factor 66. Actual AC line current 64 is compared to AC line current reference 63 to create error signal 65. Error signal 65 drives buck stage 60 as part of this servo loop. Current 41 and voltage 42 of PV source 10 are sensed and multiplied to provide 43, a measure of PV source 10 output power. Scaling factor 66 is periodically adjusted to determine the amount of energy sourced onto AC line 90. A control means is used to periodically perturb (45) scaling factor 66 and observe (44) the effect on PV output power 43. If an increase in scaling factor 66 results in an increase in PV power 43, scaling factor 66 is incrementally increased every perturb cycle until an increase in scaling factor 66 results in a decrease in PV power 43. This is how the maximum power point (MPP) of PV source 10 is established. Boost stage 40 is transparent to this perturb and observe function and serves as a typical voltage regulator to maintain the voltage at energy storage capacitor 50 at a regulated voltage higher that the peak voltage of the AC line. Fixed reference voltage 48 is compared to feedback voltage 49 creating error signal 47 to drive boost stage 40. In some inverters designed to work with PV voltages higher than the peak AC line voltages, boost stage 40 is not required.

The problem with this prior art control method is instability and poor dynamic response. If current reference 63 requests a current and therefore power to be delivered into the AC line that PV source 10 cannot supply, the control loop becomes unstable, PV source 10 voltage collapses and cannot be recovered without restarting the power converter and the perturb and observe process. This prior art control method is unstable when operating on the lower-voltage side of the PV source maximum power point. The maximum power point of a photovoltaic source usually changes slowly but moving cloud cover, wind gusts and partial, momentary PV source shadowing can abruptly push the maximum power point into an unstable region for this control method.

SUMMARY OF THE INVENTION

The invention is a novel DC-to-AC power converter topology and a novel control method that makes this combination of topology and control very well suited for photovoltaic microinverter applications. Also, a novel variant of this control method is disclosed for application with a number of known photovoltaic DC-to-AC power converter topologies. The primary function of both control methods is to seek the maximum power point (MPP) of the photovoltaic source with iterative, perturb and observe algorithms. The control portion of this invention discloses two related control methods, both an improvement over prior art by virtue of having greatly improved stability, dynamic response and accuracy.

DETAILED DESCRIPTION OF THE INVENTION

Figure 1:
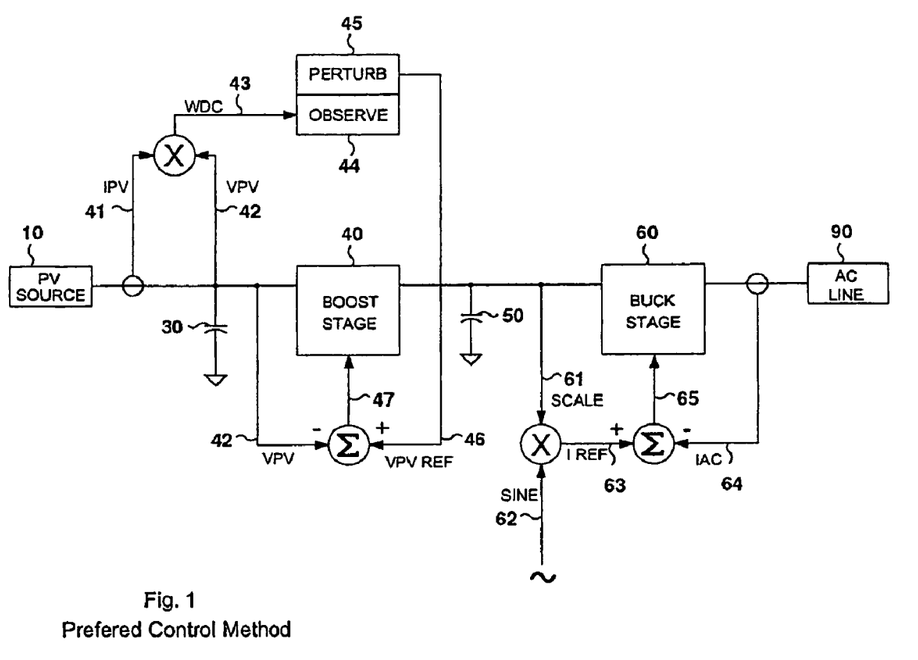
FIG. 1 shows the preferred embodiment of the power converter control method.

FIG. 1 illustrates the preferred embodiment of the control arrangement for the DC-to-AC power converter. This power converter has a pulse width modulated, voltage regulating boost stage and a pulse width modulated, current regulating buck stage. Sinusoidal reference 62 follows the AC line voltage and frequency. AC line current reference 63 is generated by multiplying sinusoidal reference 62 by scaling factor 61. Scaling factor 61 is a measure of the voltage on energy storage capacitor 50. Actual AC line current 64 is compared to AC line current reference 63 to create error signal 65. Error signal 65 drives buck stage 60 as part of this servo loop. The net effect is the voltage on energy storage capacitor 50 is regulated by the amount (the amplitude) of current 64 sourced into AC line 90. Current 41 and voltage 42 of PV source 10 are sensed and multiplied to provide 43, a measure of PV source 10 output power. PV reference voltage 46 is the desired operating point of PV source 10 and is compared to actual PV source 10 voltage 42 in a servo loop where error voltage 47 drives boost stage 40. A control means is used to periodically perturb (45) PV reference voltage 46 and observe (44) the effect on PV output power 43. If an increase in PV reference voltage 46 results in an increase in PV power 43, PV reference voltage 46 is incrementally increased every perturb cycle until an increase in PV reference voltage 46 results in a decrease in PV power 43. This is how the maximum power point (MPP) of PV source 10 is established. If the irradiance on and the temperature of photovoltaic source 10 are substantially stable. PV source voltage 42 will dither a small amount about the MPP of PV source 10. This control method provides stable operation at any PV source operating point. As conditions change the control circuit will track and seek a new MPP.

Figure 3:
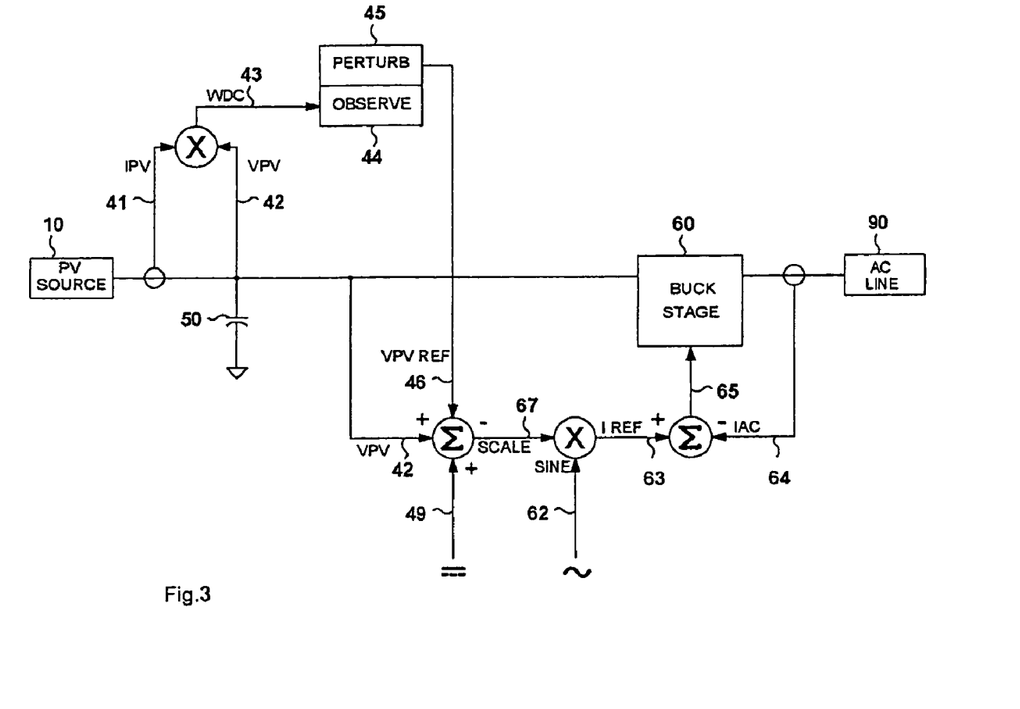
FIG. 3 shows an alternate embodiment of the power converter control method.

FIG. 3 illustrates an alternate embodiment of the control arrangement for the DC-to-AC power converter. This power converter has a pulse width modulated, current regulating buck stage and no boost stage. Sinusoidal reference 62 follows the AC line voltage and frequency. AC line current reference 63 is generated by multiplying sinusoidal reference 62 by scaling factor 67. Scaling factor 67 is the error signal or difference between the actual operating voltage 42 of PV source 10 and PV reference voltage 46, the desired operating voltage of PV source 10. A fixed offset voltage 49 is also added scaling factor 67. Actual AC line current 64 is compared to AC line current reference 63 to create error signal 65. Error signal 65 drives buck stage 60 as part of this servo loop. Current 41 and voltage 42 of PV source 10 are sensed and multiplied to provide 43, a measure of PV source 10 output power. A control means is used to periodically perturb (45) PV reference voltage 46 and observe (44) the effect on PV output power 43. If an increase in PV reference voltage 46 results in an increase in PV power 43, PV reference voltage 46 is incrementally increased every perturb cycle until an increase in PV reference voltage 46 results in a decrease in PV power 43. This is how the maximum power point (MPP) of PV source 10 is established. If the irradiance on and the temperature of photovoltaic source 10 are substantially stable. PV source voltage 42 will dither a small amount about the MPP of PV source 10. This control method provides stable operation at any PV source operating point. As conditions change the control circuit will track and seek a new MPP.

Figure 4:
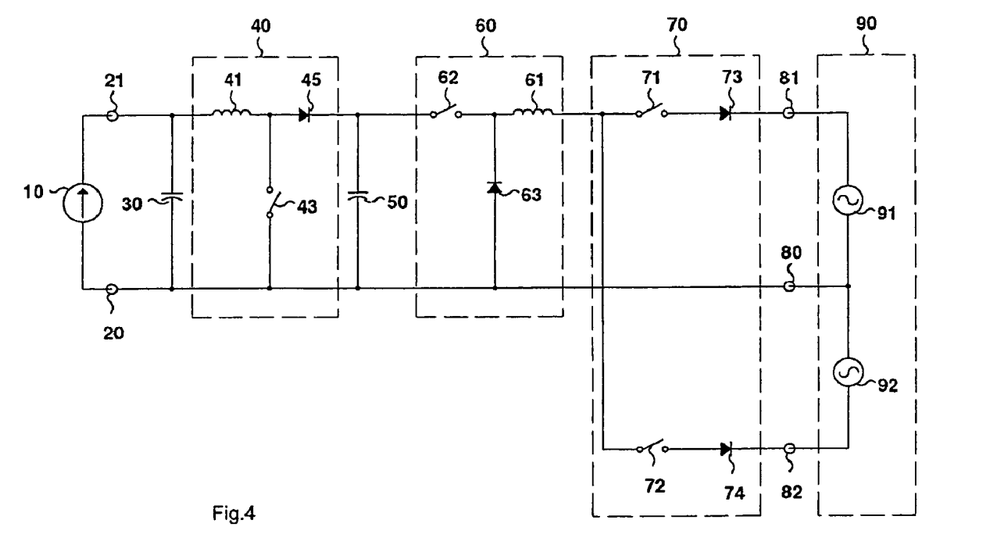
FIG. 4 shows the preferred embodiment of the power converter electrical circuit topology to be used with the control method illustrated in FIG. 1.

FIG. 4 illustrates the preferred embodiment of the DC to AC power converter topology. Photovoltaic source 10 is connected at power converter input terminals 20 and 21. Capacitor 30 holds the photovoltaic source 10 voltage substantially constant during the high frequency switching cycle of boost circuit 40. Boost circuit 40 is a conventional pulse width modulated boost circuit comprising inductor 41, semiconductor power switch 43 and diode 45. Boost circuit 40 converts the voltage on capacitor 30 to a voltage greater than the peak voltages of AC line 90. Buck circuit 60 is a conventional pulse width modulated buck circuit comprising inductor 61, semiconductor power switch 62 and diode 63. Boost circuit 40 is a voltage regulator. Buck circuit 60 is a current regulator regulating half sinewaves of current, synchronized with the voltage of AC line 90. Unfolder circuit 70 is novel. Switch 71 is closed when AC line 91 is positive with respect to neutral terminal 80 and switch 72 is closed when AC line 92 is positive with respect to neutral terminal 80. Diodes 73 and 74 provide protection against the simultaneous closure of switches 71 and 72. It may appear that this arrangement permits DC to flow into the power line, which is limited by present interconnection standards. However, the true limitation is to avoid DC flux in the core of the power line transformer. This is accomplished by the alternate pulsating current in the two lines. The effect on the transformer is no different from that of a full-wave rectifier. A considerable advantage of this preferred embodiment is that negative pole 20 of the photovoltaic source 10 is maintained at the potential of AC line neutral 80. This greatly improves safety and reduces electrical noise emitted from the PV source 10, minimizing interference with nearby residential electronic equipment. The configurations for boost circuit 40 or buck circuit 60 can be any circuit that accomplishes the described results and are not limited to the circuit configurations shown in FIG. 4.

The topology illustrated in FIG. 4 when used with the control method illustrated in FIG. 1 enables two substantial improvements over the prior art. In the invention, boost stage 40 is allowed to run with its own independent feedback loop controlled solely for holding the maximum power point (MPP) of PV source 10. This control is such that there are very little 60 Hz or 120 Hz current components in capacitor 30. Capacitor 30 must store only enough energy to cover one high frequency switching period of boost stage 40. This switching period is roughly 1/300th as long as the rectified 60 Hz period. Thus capacitor 30 can be much smaller than in a conventional inverter. The second change is to allow the voltage on energy storage element, capacitor 50, to go much higher than the peak voltage of AC line 90. Since stored energy is proportional to the square of voltage, any voltage increase exponentially reduces the capacitance value required of capacitor 50. The value of capacitor 50 can now be in the order of 100 nanofarads per watt converted. Therefore, both capacitors can be low enough in capacitance value to be economic plastic film units. Also, operation at high boost ratios also requires some means to constrain the voltage on capacitor 50 to levels that are safe for semiconductor devices 43, 45, 62 and 63. The present invention controls the voltage on capacitor 50 by adjusting the current out of the inverter into AC line 90 while maintaining its sinusoidal quality. This topology enables the use of a control method with two independent control loops that do not interfere with each other in the presence of rapid changes in the amount of power available from PV source 10 or rapid changes in AC line 90 voltages.

Figure 5A:
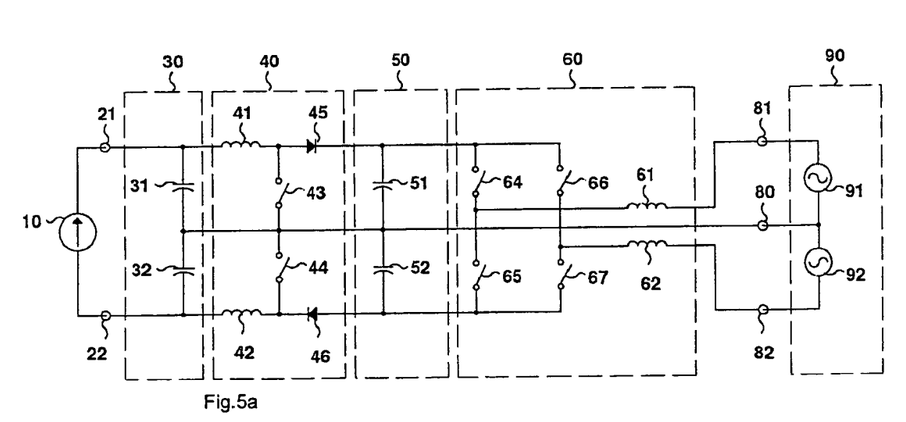
FIG. 5 shows a bi-polar boost, prior art inverter electrical topology to be used with the control method illustrated in FIG. 1.

FIG. 5A shows an alternate embodiment of the invention where a bipolar boost circuit and an H-bridge buck circuit are used with the control method illustrated in FIG. 1. Photovoltaic source 10 is connected at power converter input terminals 21 and 22. Capacitors 31 and 32 hold the photovoltaic source 10 voltage substantially constant during the high frequency switching cycles of boost circuit 40. Boost stage 40 is a pulse width modulated bipolar boost circuit comprising inductor 41, semiconductor power switch 43 and diode 45 for the positive monopole and inductor 42, semiconductor power switch 44 and diode 46 for the negative monopole. Boost circuit 40 converts photovoltaic source 10 voltage to a positive voltage on capacitor 51 and a negative voltage on capacitor 52, both with respect to AC line neutral 80 and both substantially greater than the respective positive and negative peak voltages of AC line 90. Energy storage element 50, comprising capacitors 51 and 52, stores energy to limit the voltage excursions across capacitors 51 and 52 as energy is drawn from energy storage element 50 at twice the AC line frequency. Buck stage 60 comprises of two half-bridge circuits. Power semiconductor devices 64 and 65 and inductor 61 are the boost circuit components feeding AC line 91. Power semiconductor devices 66 and 67 and inductor 62 are the boost circuit components feeding AC line 92. Boost circuit 40 is a voltage regulator. Buck circuit 60 is a current regulator regulating sinewave currents into AC lines 91 and 92. AC line 90 is a typical residential 120/240V, split-phase utility service. This arrangement of any conventional, prior art, boost and buck converters is obvious. The amalgamation of this topology and the control method illustrated in FIG. 1 is claimed as useful, novel and an improvement over prior art.

Figure 5B:
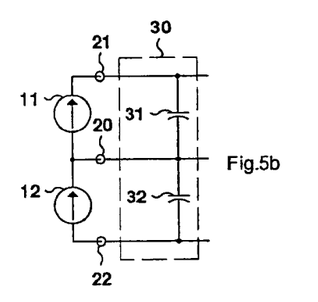

FIG. 5B shows a variation of the topology illustrated in FIG. 5A where photovoltaic source 10 is bipolar with a positive source 11 connected across capacitor 31 and a negative source 12 connected across capacitor 32 and where all said polarity references are with respect to photovoltaic common connection point 20 and AC line neutral 80.

Figure 5C:
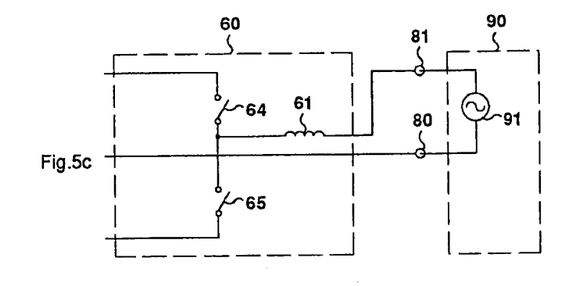

FIG. 5C shows a variation of the topology illustrated in FIG. 5A where buck stage 60 uses only one half-bridge circuit comprising semiconductor power devices 64 and 65 and inductor 61. This topology variation is intended for use with single phase AC line 90 rather than the split-phase configuration shown in FIG. 5A.

Figure 6A:
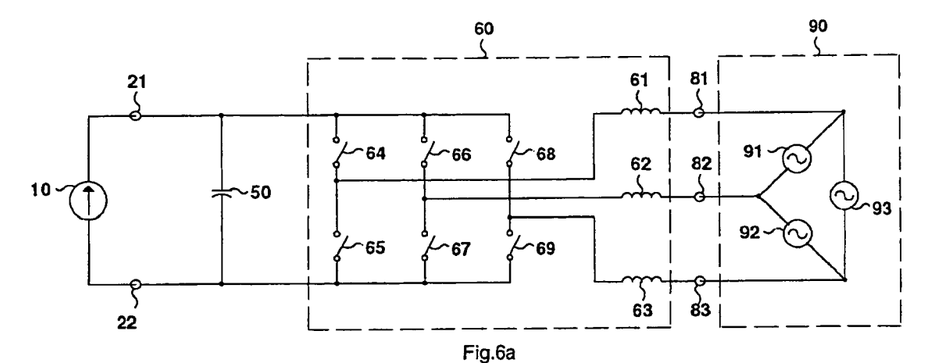
FIG. 6 shows a polyphase, prior art inverter electrical topology to be used with the control method illustrated in FIG. 3.

FIG. 6A illustrates a conventional, known DC to polyphase AC power converter topology where photovoltaic source 10 is connected to input terminals 21 and 22 across the energy storage element, capacitor 50. Buck circuit 60 comprises semiconductor power devices 64 through 69 and inductors 61, 62 and 63 feeding AC lines 91, 92 and 93 respectively. This topology of any conventional, prior art, poly-phase buck converter is known. The amalgamation of this topology and the control method illustrated in FIG. 3 is claimed as useful, novel and an improvement over the prior art.

Figure 6B:
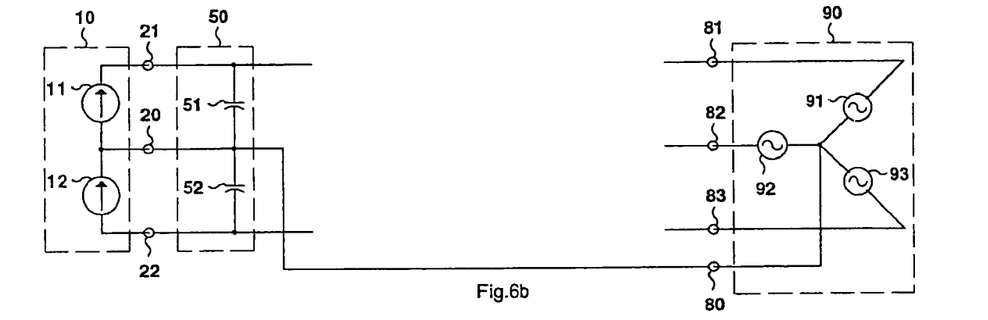

FIG. 6B shows a variation of the topology illustrated in FIG. 6A where photovoltaic source 10 is bipolar with a positive source 11 connected across capacitor 31 and a negative source 12 connected across capacitor 32 and where all said polarity references are with respect to photovoltaic common connection point 20 and AC line neutral 80. This configuration enables the power converter to be connected to a 4-wire, wye configured AC line 90.

Figure 7:
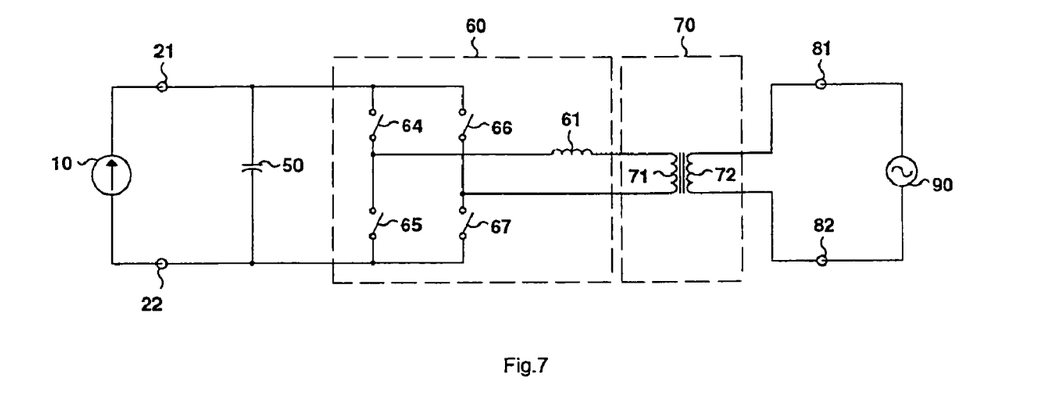
FIG. 7 shows an H-bridge with transformer, prior art inverter electrical topology to be used with the control method illustrated in FIG. 3.

FIG. 7 illustrates a conventional DC to AC power converter topology where photovoltaic source 10 is connected to input terminals 21 and 22 across the energy storage element, capacitor 50. Buck circuit 60 is configured as a full or H-bridge and comprises semiconductor power devices 64, 65, 66, 67 and inductor 61. Buck regulator 60 is a current regulator regulating sinewave current synchronized with AC line voltage 90 into primary winding 71 of transformer 70. Transformer 70 provides voltage isolation and steps up the voltage on primary winding 71 to a higher voltage on secondary winding 72. This topology of any conventional buck converter and a step-up, line-frequency transformer is known. The amalgamation of this topology and the control method illustrated in FIG. 3 is claimed as useful, novel and an improvement over prior art.

What is claimed is:

1. A power converter configured to convert direct current (DC) from a source to alternating current (AC) for supply to an AC line, the power converter comprising:
   an energy storage device;
   a buck stage configured to regulate voltage on the energy storage device as a function of current sourced into the AC line;
   a boost stage configured to be driven by an error between source voltage and a reference voltage; and
   a controller configured to incrementally increase the reference voltage until a corresponding decrease in source power results.

2. The power converter of claim 1, wherein the energy storage device is an electrolytic capacitor.

3. The power converter of claim 1, wherein the energy storage device is a plastic film capacitor.

4. The power converter of claim 1, wherein the source is a photovoltaic module.

5. A method for controlling a DC-to-AC power from a power source to a power line, comprising:
   regulating voltage on an energy storage capacitor by an amount of current sourced into the power line;
   driving a boost stage based on an error between source voltage and a reference voltage; and
   incrementally increasing the reference voltage until a corresponding decrease in source power results.

6. A power converter configured to convert direct current (DC) from a source to alternating current (AC) for supply to an AC line, the power converter comprising:
   a buck stage through which power is delivered from the source to the AC line, the buck stage being configured to be driven as a servo loop that includes an error signal that is input to the buck stage, the error signal being a function of a scaling factor derived from a voltage from the source and from a reference voltage; and
   a controller configured to incrementally increase the reference voltage until a corresponding decrease in source power results.

7. The power converter of claim 1, wherein the source is a photovoltaic module.

* * * * *